(12) United States Patent
Garza et al.

(10) Patent No.: US 8,799,347 B2
(45) Date of Patent: Aug. 5, 2014

(54) SYSTEM AND METHOD FOR RESOLVING A UNIT OF WORK

(75) Inventors: Jose Emir Garza, Surrey (GB); Stephen James Hobson, Middlesex (GB); Steven Powell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1473 days.

(21) Appl. No.: 12/038,732

(22) Filed: Feb. 27, 2008

(65) Prior Publication Data

US 2008/0208977 A1    Aug. 28, 2008

(30) Foreign Application Priority Data

Feb. 28, 2007    (EP) .................................... 07103211

(51) Int. Cl.
*G06F 15/16*    (2006.01)
(52) U.S. Cl.
USPC .......................................... 709/201; 709/205
(58) Field of Classification Search
USPC ................................................. 709/201, 205
See application file for complete search history.

(56) References Cited

U.S. PATENT DOCUMENTS 5,561,797 A * 10/1996 Gilles et al. ........................... 1/1
2008/0114827 A1 * 5/2008 Gerber et al. ................. 709/201

FOREIGN PATENT DOCUMENTS

EP           0 707 265         4/1996
WO       WO 2006/108799     10/2006

OTHER PUBLICATIONS

Allamaraju, "Nuts and Bolts of Transaction Processing," http:/www.subbu.org/articles/transactions/NutsandBoltsofTP.html#DTC, Jun. 18, 2008.

* cited by examiner

*Primary Examiner* — Noel Beharry
*Assistant Examiner* — Farhad Ali
(74) *Attorney, Agent, or Firm* — Novak Druce Connolly Bove + Quigg LLP

(57) ABSTRACT

A method for resolving a unit of work involving a plurality of participants, the method comprising the steps of: generating logic comprising an identifier generator; aggregating the logic with an owning application of a unit of work; and in response to the owning application initiating the unit of work, generating, by the identifier generator, an identifier associated with the unit of work.

18 Claims, 11 Drawing Sheets

Table 6.1 Prepare

|  | State | Action | New state |
|---|---|---|---|
| 6.1.1 | In flight | 6.1.1.1<br><br>prepare<br>if (prepare OK)<br>    update state<br>    broadcast "prepared" | Prepared |
|  |  | 6.1.1.2<br><br>else (prepare failed)<br>    abort<br>    return "backed out"<br>    broadcast "aborted"<br>    forget | No record |
| 6.1.2 | Prepared | ignore | Prepared |
| 6.1.3 | Committed | ignore | Committed |
| 6.1.4 | No record | ignore | No record |

FIG. 6A

Table 6.2 Prepared

|  | State | Action | Output state |
|---|---|---|---|
| 6.2.1 | No record | return "backed out"<br>broadcast "abort" | No record |
| 6.2.2 | In flight | 6.2.2.1<br>prepare<br>if (prepare OK)<br>   update state ("prepared")<br>   if (all others prepared)<br>      commit<br>      return commit OK<br>      update state ("committed")<br>      broadcast "committed" | Committed |
|  |  | 6.2.2.1.1<br>   else (not all prepared)<br>   broadcast "prepared" | Prepared |
|  |  | 6.2.2.1.2<br>   if (all committed)<br>   forget | No record |
|  |  | 6.2.2.2<br>else (prepare failed)<br>   abort<br>   return "backed out"<br>   broadcast "abort"<br>   forget | No record |
| 6.2.3 | Prepared | 6.2.3.1<br>if (all others prepared)<br>   commit<br>   return commit OK<br>   update state<br>   broadcast "committed" | Committed |
|  |  | 6.2.3.2<br>if (all committed)<br>   forget | No record |

FIG. 6B

| | State | Action | Output state |
|---|---|---|---|
| | | 6.2.3.3<br><br>else (not all others prepared)<br>　update state<br>　ignore | Prepared |
| 6.2.4 | Committed | ignore | Committed |

FIG. 6B continued

Table 6.3 Committed

|  | State | Action | Output state |
|---|---|---|---|
| 6.3.1 | No record | broadcast "committed" | No record |
| 6.3.2 | In flight | N/A | |
| 6.3.3 | Prepared | 6.3.3.1<br>commit<br>return commit OK<br>update state<br>broadcast "committed" | Committed |
| | | 6.3.3.2<br>if (all committed)<br>   forget | No record |
| 6.3.4 | Committed | 6.3.4.1<br>if (all committed)<br>   forget | No record |
| | | 6.3.4.2<br>if (not all committed)<br>   update state<br>   ignore | Committed |

FIG. 6C

Table 6.4 Request state (while prepared)

|  | State | Action | Output state |
|---|---|---|---|
| 6.4.1 | No record | Same as Prepared. |  |
| 6.4.2 | In flight | Same as Prepared. |  |
| 6.4.3 | Prepared | 6.4.3.1<br>if (all others prepared)<br>   same as Prepared. |  |
|  |  | 6.4.3.2<br>else (not all others prepared)<br>   update state<br>   broadcast "prepared" | Prepared |
| 6.4.4 | Committed | broadcast "committed" | Committed |

FIG. 6D

Table 6.5 Request state (while committed)

|  | State | Action |
|---|---|---|
| 6.5.1 | No record | Same as Committed. |
| 6.5.2 | In flight | Same as Committed. |
| 6.5.3 | Prepared | Same as Committed. |
| 6.5.4 | Committed | 6.5.4.1<br>if (all committed)<br>forget |
|  |  | 6.5.4.2<br>update state<br>  broadcast<br>  "committed" |

FIG. 6E

Table 6.6. Backout

|  | State | Action | Output state |
|---|---|---|---|
| 6.6.1 | No record | return "backed out" | No record |
| 6.6.2 | In flight | backout<br>return "backed out"<br>forget | No record |
| 6.6.3 | Prepared | N/A | |
| 6.6.4 | Committed | N/A | |

FIG. 6F

Table 6.7 Abort

|  | State | Action | Output state |
|---|---|---|---|
| 6.7.1 | No record | ignore | No record |
| 6.7.2 | In flight | abort<br>return "backed out"<br>forget | No record |
| 6.7.3 | Prepared | abort<br>return "backed out"<br>forget | No record |
| 6.7.4 | Committed | N/A | |

FIG. 6G

SYSTEM AND METHOD FOR RESOLVING A UNIT OF WORK

CROSS-REFERENCE TO RELATED APPLICATION

This application claims the benefit of British Patent Application No. 07103211.4, filed Feb. 28, 2007, which is incorporated by reference herein in its entirety.

FIELD OF THE INVENTION

The present invention relates to a method, system and computer program for resolving a unit of work.

BACKGROUND OF THE INVENTION

In the field of transaction processing, units of work are generally required to have what are known as the ACID properties. ACID is an acronym representing the following four unit-of-work properties: Atomicity, Consistency, Isolation and Durability. Atomicity requires that either all the operations of the unit of work must be seen to occur or none must be seen to occur. Consistency requires a unit of work to maintain the consistency of the data on which it operates. Isolation requires a unit of work not to read the intermediate results of another transaction. Durability requires the results of a committed unit of work to be made permanent and that the other ACID attributes can be guaranteed even in the event of system failure.

For example, a well known and understood unit of work is a transaction, and it is the role of a transaction coordinator or middleware to provide atomicity. Thus, for example, if an application involves two operations in a transaction and then requests the transaction co-ordinator to commit the transaction, the transaction co-ordinator must ensure that both operations commit (succeed). Alternatively, if the application requests the transaction co-ordinator to back out the transaction, the transaction coordinator must ensure that both operations are backed out (fail).

A major problem in providing atomicity is that it must be guaranteed even in the event of failure associated with a system on which the transaction coordinator and/or a participant are executing. It will be appreciated that such a failure may relate to a loss of power or the failure of a hardware device such as on board memory or a DASD holding a database. For example, if a transaction involves two operations and then commits, the system might fail after the transaction co-ordinator has committed the first operation but before the same has been done for the second operation. As a result, when the system is restarted, the transaction coordinator must ensure that the second operation also commits.

It may not always be possible to install a transaction coordinator in an environment, for example, because software associated with the transaction co-ordinator is costly or because an administrative burden associated with installing and maintaining the transaction coordinator is complex and costly.

SUMMARY

According to a first aspect there is provided a method for resolving a unit of work involving a plurality of participants. The method can include: generating logic comprising an identifier generator; aggregating the logic with an owning application of a unit of work; and in response to the owning application initiating the unit of work, generating, by the identifier generator, an identifier associated with the unit of work.

According to a second aspect there is provided a system for resolving a unit of work involving a plurality of participants. The system can include: a logic generator for generating logic; an aggregator for aggregating the logic with an owning application of a unit of work; and an identifier generator associated with the logic, responsive to the owning application initiating the unit of work, for generating an identifier associated with the unit of work.

According to a third aspect there is provided a computer program comprising a computer-readable medium, such as an optical disk, in which is embedded computer-readable program code. The computer-readable program code can be configured to cause a computer to perform all or various ones of the procedures described herein when the computer-readable program code is loaded on and executed by the computer.

BRIEF DESCRIPTION OF THE DRAWINGS

The present invention will now be described, by way of example only, with reference to preferred embodiments thereof, as illustrated in the following drawings:

FIG. 6A to 6G are tables representing data associated with a transaction.

DETAILED DESCRIPTION

Figure 1:
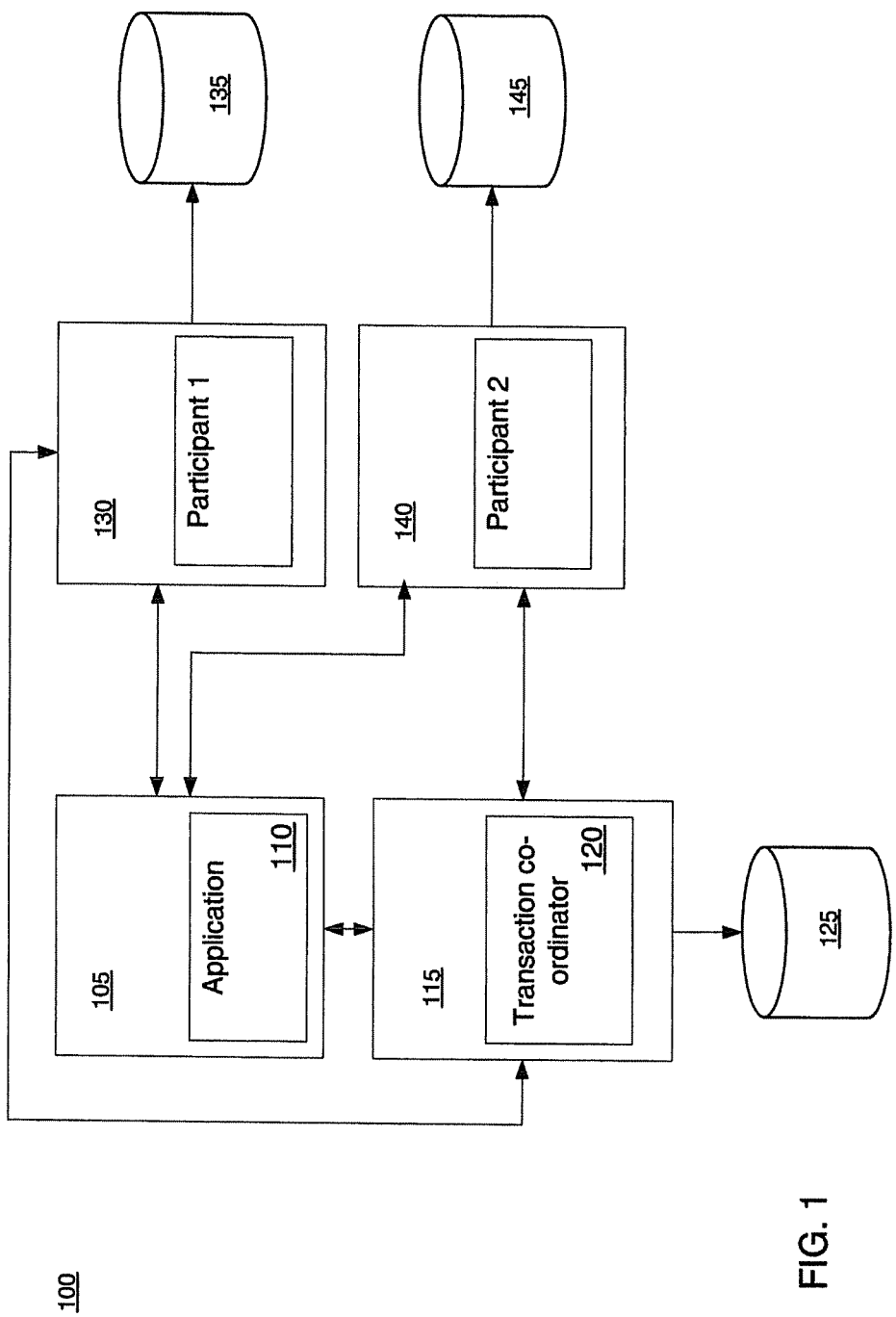
FIG. 1 is a block diagram of a prior art transactional system.

FIG. 1 is a block diagram of a transactional system (100), wherein a first data processing system (105) comprises an owning application (110) and a second data processing system (115) comprising a transaction co-ordinator (120) for executing transactions. There is also shown a third data processing system (130) comprising a first participant for managing a first resource (e.g., a database). There is also shown a fourth data processing system (135) comprising a second participant for managing a second resource (e.g., a database). The system (100) also comprises a plurality of logs (125, 135 and 145) to which the transaction coordinator (120), the first participant and the second participant can respectively write one or more log records (i.e., wherein a log record comprises data associated with a transaction). It should be understood that components involved in a transaction (i.e., the owning application (110), the transaction co-ordinator (120), Participant 1 and Participant 2) can reside on any data processing system and that the components can all reside on the same data processing system.

Figure 2:
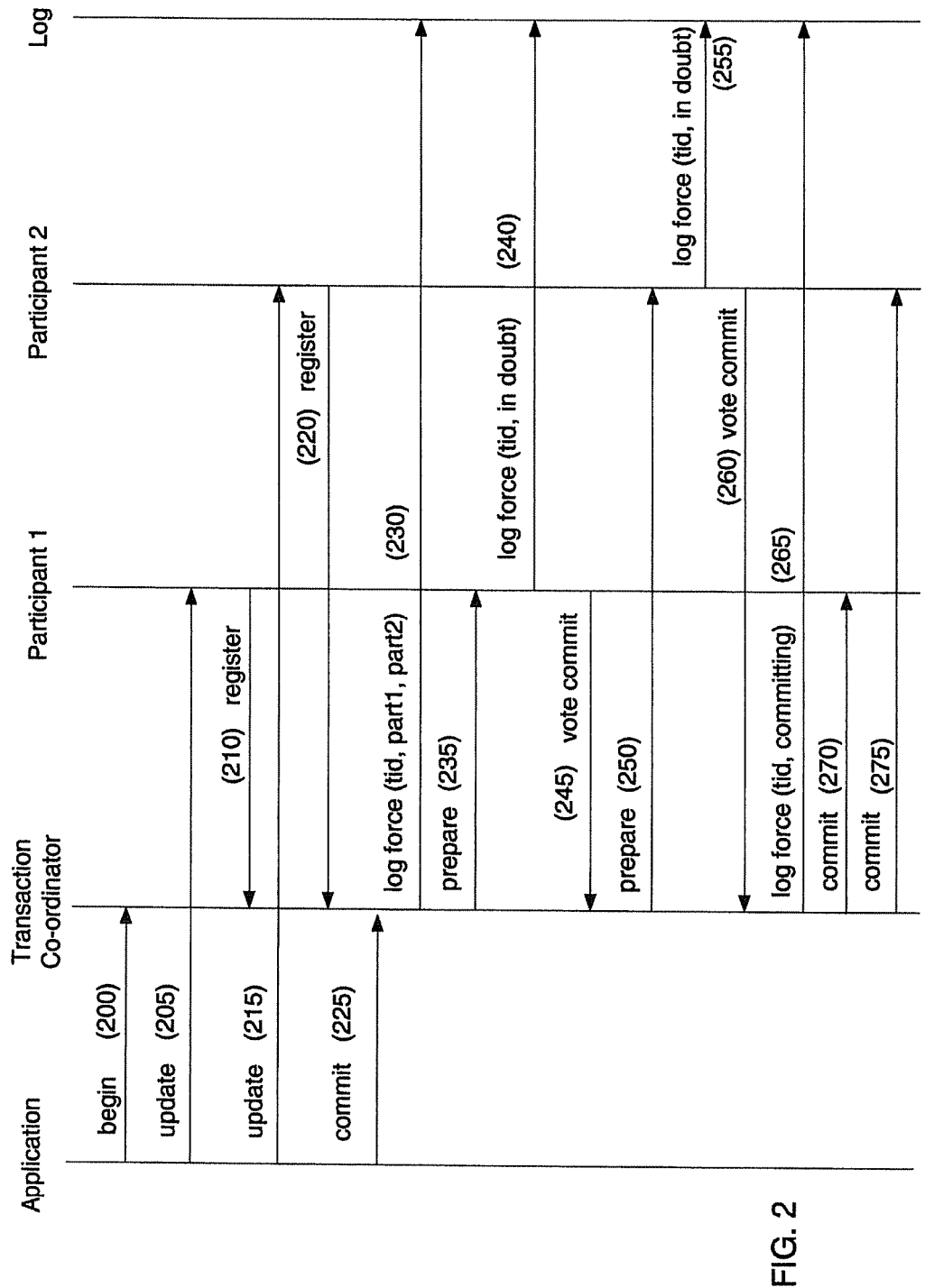
FIG. 2 is a schematic diagram of prior art components involved in a transaction and the flows between those components.

According to the preferred embodiments, the chosen unit of work is a transaction. FIG. 2 is a schematic diagram of the components involved in an example transaction and the flows involved between the components, according to a two phase commit protocol. Firstly, the application (110) flows a begin request (200) to the transaction co-ordinator (120), which indicates the start of a transaction. Next, the application (110) sends an update request (205) (i.e., a request that makes a change to a participant), to Participant 1. In response to receiving the update request, Participant 1 registers (210) as a participant in the transaction with the transaction co-ordinator (120) and receives a transaction identifier of the transaction in response. Next, the application sends an update request (215) to Participant 2. In response to receiving the update request, Participant 2 registers (220) as a participant in the transaction with the transaction co-ordinator (120) and receives a transaction identifier of the transaction in response.

In response to Participant 1 and Participant 2 successfully performing the update requests, the application (110) sends a commit request (225) to the transaction coordinator (120). The application (110) does not regain control until commit processing completes.

In response to the commit request (225) from the application (110), the transaction co-ordinator (120) force writes (230) a first log record to the log (125), wherein the first log record comprises an identifier associated with the transaction, an identifier associated with Participant 1 and an identifier associated with Participant 2. Participant 1 does not have data associated with Participant 2 and vice versa. Thus, only the transaction coordinator has data associated with participants in a transaction. Note that a forced write does not return until the data written is hardened to non-volatile storage.

Next, once the forced log write completes (guaranteeing the data is stored in non-volatile storage), the transaction coordinator (120) flows a prepare request (235) to Participant 1. It should be understood that a participant, after being involved in the transaction, assumes backout until it receives a prepare request. In other words if the participant chooses to take unilateral action for the transaction, after being involved in a transaction and before receiving a prepare request, it should backout updates associated with the transaction.

In response to receiving the prepare request, Participant 1 force writes (240) a second log record to the log, wherein the second log record comprises the transaction identifier received in response to the register request and a state associated with the transaction, namely, "in doubt." This state indicates that Participant 1 can no longer assume backout, but needs to wait to be informed of a transaction outcome. Next, Participant 1 flows a commit vote (245) (i.e., a response to the prepare request) to the transaction co-ordinator (120), indicating that Participant 1 can successfully participate in the transaction. It should be understood, that if Participant 1 cannot successfully participate in the transaction, it should back out any updates it performed and vote backout without writing a log record.

Next, the transaction coordinator (120) flows a prepare request (250) to Participant 2. In response to receiving the prepare request, Participant 2 force writes (255) a third log record to the log, wherein the third log record comprises the transaction identifier and a state associated with the transaction, namely, "in doubt." This state indicates that Participant 2 can no longer assume backout, but needs to wait to be informed of the transaction outcome. Next, Participant 2 flows a commit vote (260) (i.e. a response) to the transaction co-ordinator (120), indicating that Participant 2 can successfully participate in the transaction. It should be understood, that if Participant 2 cannot successfully participate, it should back out any updates it performed and vote backout without writing a log record.

The transaction coordinator (120) collects all votes, but the collected votes are not hardened in the log (125). Next, the transaction coordinator (120) force writes (265) a fourth log record to the log, wherein the fourth log record comprises the transaction identifier and a computed outcome associated with the transaction. Assuming that all participants voted commit, the decision is commit. If one or more participants vote backout, the decision is backout.

Next, the transaction coordinator (120) flows a commit request (270) to Participant 1 and a commit request (275) to Participant 2, indicating to the participants that they should commit the transaction. After, the transaction has been committed, the participants "forget" the transaction, resulting in the log records associated with the participants becoming eligible for purging.

Further note that the transaction described with reference to FIG. 2 is an example of a two-phase commit transaction. One of ordinary skill will realise that there are many variations possible. For example, the transaction may contain any number of participants and further one or more participants may not perform updates.

Figure 3:
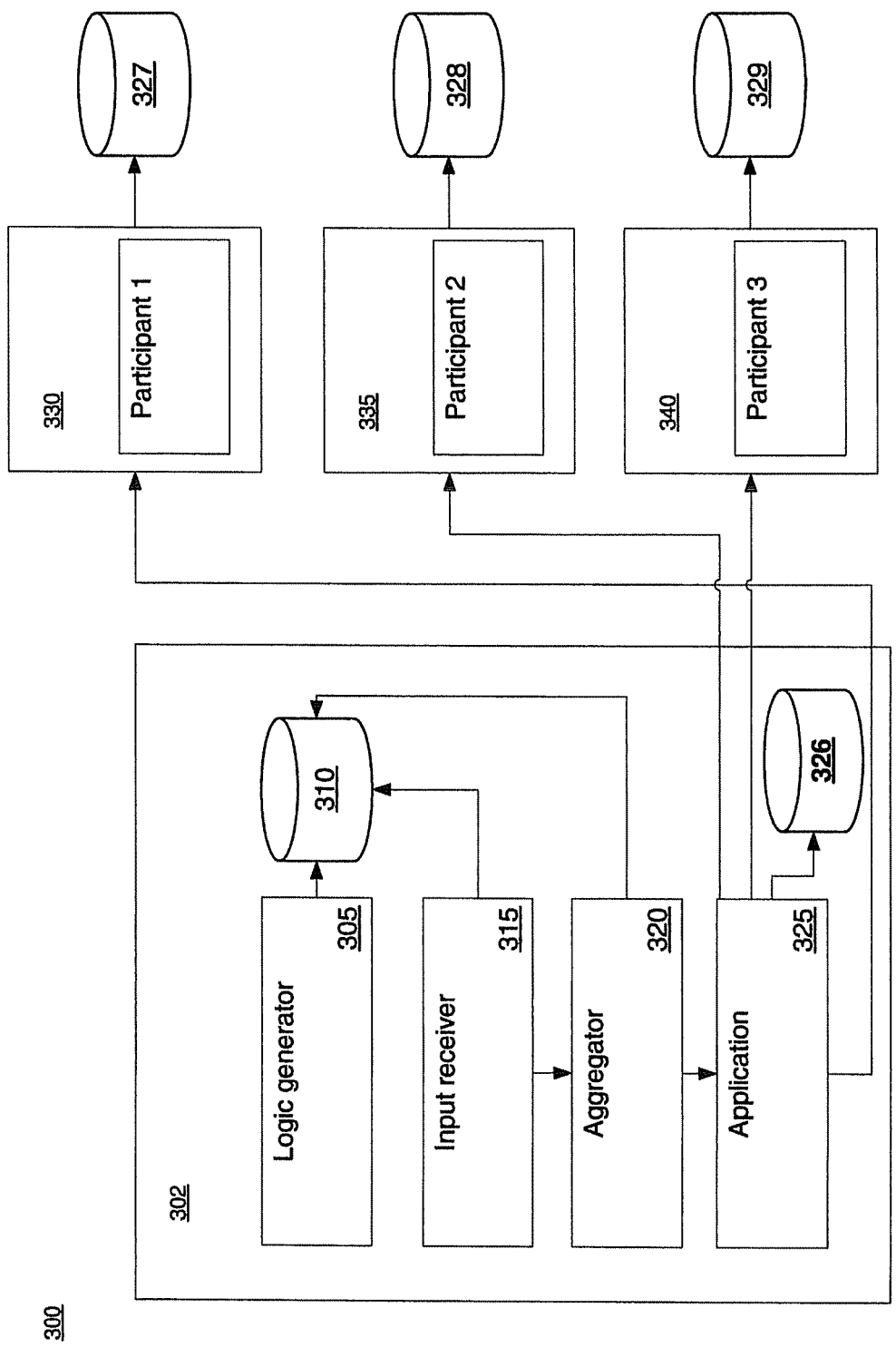
FIG. 3 is a block diagram of a transactional system according to a preferred embodiment.

FIG. 3 is a block diagram of a transactional system (300) according to a preferred embodiment, wherein a first data processing system (302) comprises an owning application (325). There is also shown a second data processing system (330) comprising a first participant (e.g., Participant 1) for managing a first resource. There is also shown a third data processing system (335) comprising a second participant (e.g. Participant 2) for managing a second resource. There is also shown a fourth data processing system (340) comprising a third participant (e.g., Participant 3) for managing a third resource. Each participant comprises a log (327, 328 and 329) to which Participant 1, Participant 2 and Participant 3 respectively can respectively write one or more log records.

The first data processing system (302) also comprises a logic generator (305) for generating logic; a storage component (310) for storing generated logic; an input receiver (315) having access to the generated logic; an aggregator (320) having access to the generated logic and operable to communicate with the input receiver (315) and the application (325). The application (325) is operable to communicate with each of the participants.

It should be understood the transactional system (300) does not comprise a transaction coordinator.

It should also be understood each participant can communicate with another participant.

Figure 4:
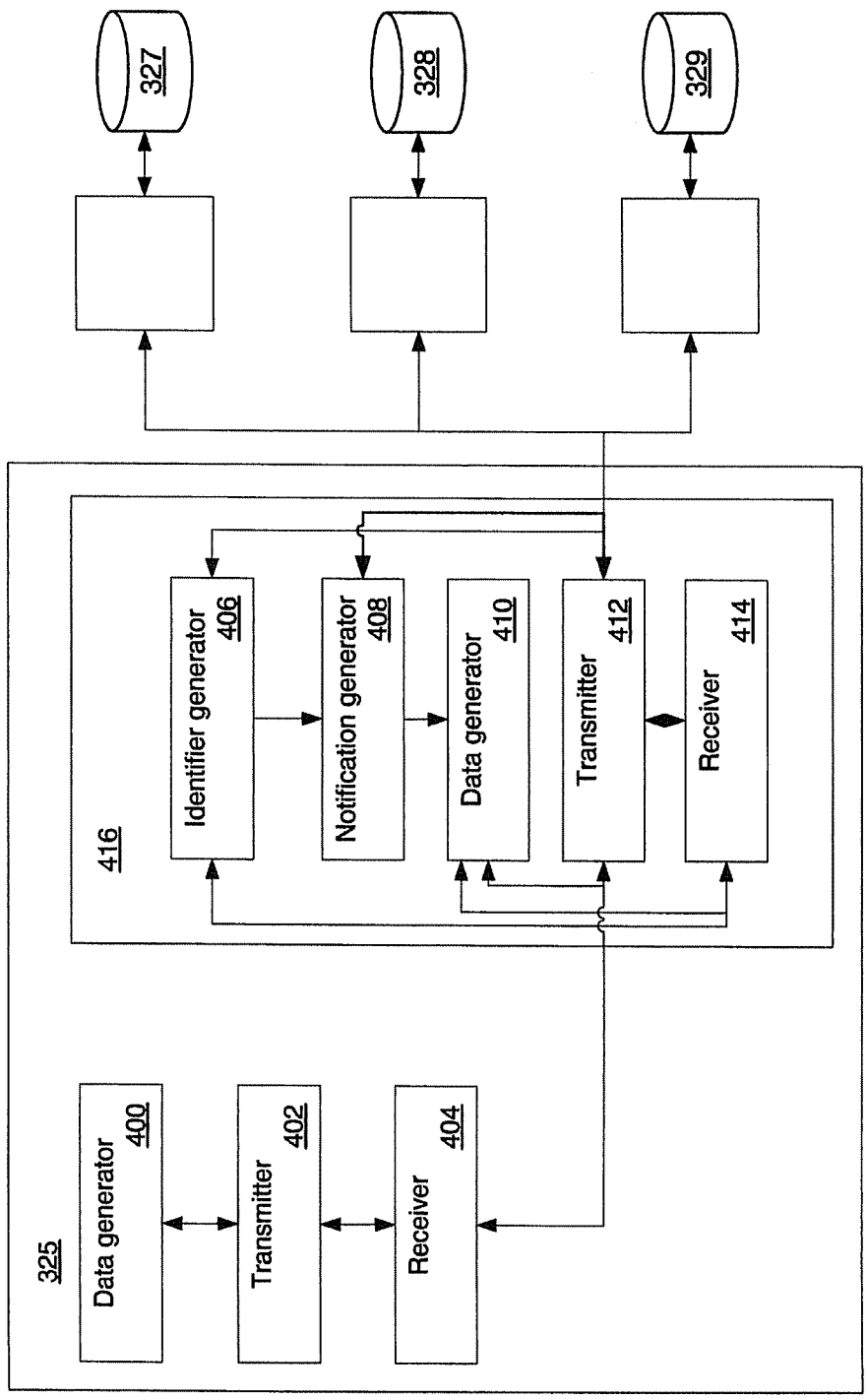
FIG. 4 is a block diagram of components of an application and a participant depicted in FIG. 3.

FIG. 4 is a block diagram showing components of the application (325) and each of the participants in more detail.

The application (325) comprises a first data generator (400) for generating data; a first transmitter (402) and a first receiver (404). The application (325) further comprises logic (416) having an identifier generator (406) for generating a unique transaction identifier; a notification generator (408) for generating a notification; a second data generator (410) for generating data; a second transmitter (412) and a second receiver (414).

A process of the preferred embodiment is now described with reference to the figures.

Figure 5:
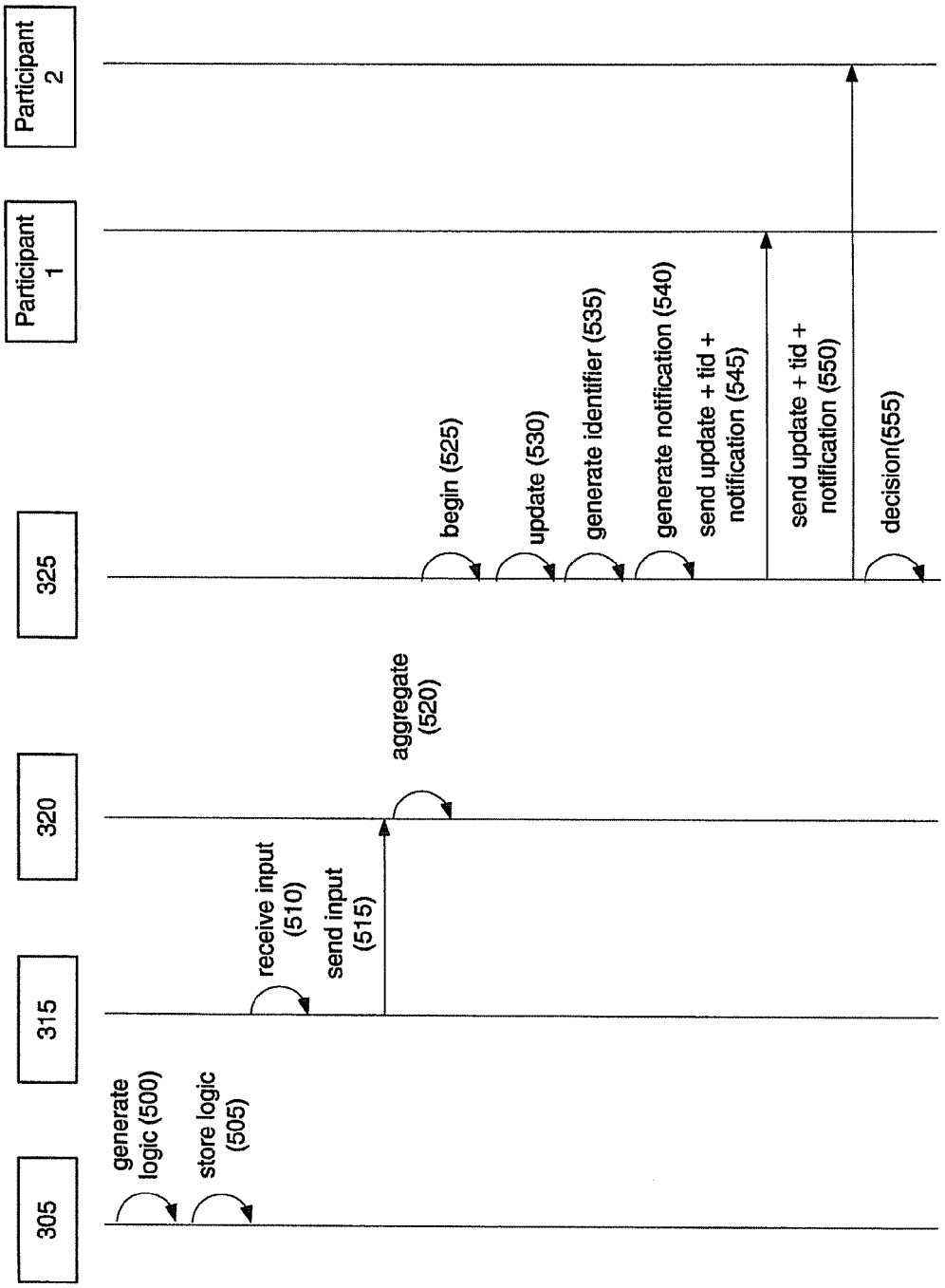
FIG. 5 is a flow chart showing the operational steps involved in a process according to the preferred embodiment.

With reference to FIG. 5, at step 500, the logic generator (305) generates the logic (416). In one example, the logic generator (305) is operable to receive input from a developer, a system, or the like in order to generate the logic (416).

At step 505, in response to generating the logic (416), the logic generator (305) stores the logic (416) in the storage component (310) (e.g., on disk).

At step 510, the input receiver (315) receives input from an entity (e.g., a developer, a system, or the like). Preferably, the input comprises a command for aggregating the generated logic (416) with the application (325); an identifier associated with the generated logic (416) and an identifier associated with the storage receiver (310).

In response to receiving the input, the input receiver (315) sends (step 515) the input to the aggregator (320). In response to receiving the input, the aggregator (320) uses the identifier associated with the generated logic (416) and the identifier associated with the storage component (310) to retrieve the identified logic (416) from the identified storage component (310). In response to the receiving the command, the aggregator (320) aggregates the logic (416) with the application (325).

In one example, the logic (416) is comprised in an object code module and the aggregator (320) aggregates the logic (416) with the application (325) at bind time. It should be understood that the aggregator (320) can aggregate further data with the application (325), for example, data associated with a participant for allowing the application to interface with the participant.

For the application (325) to initiate a transaction, the first data generator (400) generates a begin request (step 525) and the first transmitter (402) transmits the begin request to the second receiver (414), which indicates the start of a transaction.

The first data generator (400) generates an update request (step 530) (i.e., a request for making a change to a participant) and the first transmitter (402) transmits the update request to second receiver (414). The second receiver (414) passes the update request to the second transmitter (412).

In response to receipt of the update request, the identifier generator (406) generates (step 535) a unique transaction identifier. The identifier generator (406) passes the generated unique transaction identifier to the second transmitter (412).

In response to receipt of the unique transaction identifier, the notification generator (408) generates (step 540) a notification. Preferably, the notification comprises a first command indicating that the transaction is under control of the logic (416) and that the system does not comprise a transaction coordinator.

The notification generator (408) passes the generated notification to the second transmitter (412).

The second transmitter (412) transmits (steps 545 and 550 respectively) the update request, the unique transaction identifier and the notification to each participant.

In response to receiving the notification, each participant knows that it must not register with a transaction coordinator, as it would do in the prior art (e.g. steps 210 and 220 in FIG. 2).

In response receiving the update request, the unique transaction identifier and the notification, each participant performs the update request.

In response to each participant successfully performing the update requests, the first data generator (400) generates a decision (step 555) and the first transmitter (404) transmits the decision to the second receiver (414).

The decision can comprise one of: commit and backout.

The second receiver (414) passes the update request to the second transmitter (412). The second transmitter (412) transmits the decision to at least one participant.

It should be understood that in response to receiving a response from at least one participant, the second transmitter (414) can transmit data associated with an outcome of the transaction (wherein the data is generated by the second data generator (410)) to the first receiver (404).

Resulting flows in a transaction are now be described with reference to FIGS. 6A to 6G.

With reference to the description associated with FIGS. 6A to 6G, preferably, each response or request message has at least one of the following two message formats.

Format 1
Message_Type($P_1, P_2, \ldots, P_n$)
Format 2
Message_Type(($P_1, s_1$), ($P_2, s_2$), ..., ($P_n, s_n$))

In the above formats, "$P_n$" represents an identifier associated with a participant and "$s_n$" represents an identifier associated with a participant's state.

In the above formats, preferably, values of "Message_Type" can comprise:
commit
backout
state
request_state Preferably, values of the "state" Message_Type can comprise:
Unknown
Prepared
Committed
Aborted Table 6.1

If a decision is commit, the second data generator (410) generates a prepare request comprising data, namely, the unique identifier associated with the transaction and an identifier associated with all of the participants in the transaction. An example of the prepare request is shown below:
prepare (TID, P1, P2, P3)

The prepare request is sent by the second transmitter (412) to at least one participant.

In response to receiving the prepare request from the second transmitter (412), a participant (e.g., Participant 1) executes one or more actions, depending on its state.

6.1.1 In Flight

If Participant 1's state is "in flight," Participant 1 prepares.

6.1.1.2 Successful Prepare

If the preparation is successful, Participant 1's updates state data of the participants in memory (327), wherein the state data comprises the unique transaction identifier; the identifiers associated with all of the participants in the transaction (i.e., "P1" and "P2" and "P3") and associated state data. An example of the state data is shown below:

State Data:
TID; P1—"prepared"; P2—"unknown"; P3—"unknown"

Participant 1 generates (120) a broadcast response comprising its state and a state of all of the other participants in the transaction (e.g., Participant 2 and Participant 3) which Participant 1 broadcasts to all of the other participants. An example of the broadcast response is shown below:

Broadcast response:
state (P1—"prepared"; P2—"unknown"; P3—"unknown")

6.1.1.3 Unsuccessful Prepare

If the preparation is not successful, Participant 1 aborts.

Participant 1 generates and transmits a first response comprising its state (namely, "backed out") to the second receiver (414) and generates a broadcast response comprising its state (namely, "aborted") and a state of all of the other participants in the transaction (e.g., Participant 2 and Participant 3) which Participant 1 broadcasts to all of the other participants. An example of the broadcast response is shown below:

Broadcast Response:
state (P1—"aborted"; P2—"unknown"; P3—"unknown")

In response, Participant 1 can forget the transaction. A resulting state of Participant 1 is that it has no log records (i.e., "no record") associated with the transaction.

6.1.2 Prepared

If Participant 1's state is "prepared," Participant 1 ignores the prepare request in that Participant 1 does not transmit a response to the second receiver (414).

This is because, prior to Participant 1 receiving the prepare request from the second transmitter (412), Participant 1 has already received from at least one participant (e.g., Participant 2) a broadcast response comprising an indication that the at least one participant's state is "prepared." An example of the broadcast response is shown below:
Broadcast Response:
state (P1, "unknown"; P2, "prepared"; P3, "unknown")

In response to the broadcast response, Participant 1 prepared and updated state data of the participants in memory (327).

6.1.3 Committed

If Participant 1's state is "committed", Participant 1 ignores the prepare request in that Participant 1 does not transmit a response to the second receiver (414).

This is because, prior to Participant 1 receiving the prepare request from the second transmitter (412), Participant 1 has already received from at least one participant (e.g., Participant 2) a broadcast response comprising an indication of all of the other participants' state (e.g., wherein each of the other participants' state is "prepared"). An example of the broadcast response is shown below:
Broadcast Response:
state (P1, "unknown"; P2, "prepared"; P3, "prepared")

As Participant 1 determined that all of the other participants have prepared, Participant 1 prepared and committed.

6.1.4 No Record

If Participant 1's state is "no record," this is because the participants resolved the transaction and Participant 1 forgot the transaction. As a participant(s) can forget the transaction after a commit decision or an abort decision (originating from a participant), Participant 1 does not know what the decision of the transaction is and so ignores the prepare request in that Participant 1 does not transmit a response to the second receiver (414).

The second receiver (414) may receive an outcome of the transaction from another participant. If the second receiver (414) does not receive an outcome of the transaction from any of the participants, preferably, after a pre-configurable time period, the data generator (410) generates and transmits to the first receiver (404) a response comprising an indication that the outcome of the transaction is unknown.

Table 6.2

In response to preparing, a participant (e.g., Participant 2) generates a broadcast response comprising Participant 2's state (namely, "prepared") and a state of all of the other participants in the transaction (e.g., Participant 1 and Participant 3) which Participant 2 broadcasts to all of the other participants.

An example of the broadcast response is shown below:
Broadcast Response:
state (P1—"unknown"; P2—"prepared"; P3—"unknown")

Note that in a response comprising a participant's state and a state of all of the other participants in the transaction, the states of all participants cannot be "prepared." This is because, if a participant knows all other participants have prepared, the participant immediately commits.

In response to receiving the response, a participant (e.g., Participant 1) executes one or more actions, depending on its state.

6.2.1 No Record

If Participant 1's state is "no record," this is because preparation failed; Participant 1 generates and transmits a first response comprising Participant 1's state (namely, "backed out") to the second receiver (414) and generates a broadcast response comprising Participant 1's state (namely, "aborted") and a state of all of the other participants in the transaction (e.g., Participant 2 and Participant 3) which Participant 1 broadcasts to all of the other participants. An example of the broadcast response is shown below:
Broadcast Response:
state (P1—"aborted"; P2—"prepared"; P3—"unknown")

In response, Participant 1 can forget the transaction and has a resulting state of "no record".

6.2.2 In Flight

If Participant 1's state is "in flight," Participant 1 prepares.

6.2.2.1 Successful Prepare

If the preparation is successful, Participant 1 updates state data of the participants in memory (327). An example of the state data is shown below:
State Data:
TID; P1—"prepared"; P2—"prepared"; P3—"unknown"

With reference to 6.2.2.1.1, in response to at least one participant not being prepared (e.g., Participant 3), Participant 1 generates a broadcast response comprising its state and a state of all of the other participants in the transaction (e.g., Participant 2 and Participant 3) which Participant 1 broadcasts to all of the other participants. An example of the broadcast response is shown below:
Broadcast Response:
state (P1—"prepared"; P2—"prepared"; P3—"unknown")

With reference to 6.2.2.1.2, in response to all of the participants being prepared, Participant 1 commits. Participant 1 generates and transmits a first response comprising its state (namely, "committed") to the second receiver (414) and generates a broadcast response comprising its state (namely, "committed") and a state of all of the other participants in the transaction (e.g., Participant 2 and Participant 3) which Participant 1 broadcasts to all of the other participants.

An example of the broadcast response is shown below:
Broadcast Response:
state (P1—"committed"; P2—"prepared"; P3—"prepared")

In response to all of the participants being in a committed state, Participant 1 can forget the transaction and has a resulting state of "no record".

6.2.2.2 Unsuccessful Prepare

If the preparation is not successful, Participant 1 aborts. Participant 1 generates and transmits a first response comprising its state (namely, "backed out") to the second receiver (414) and generates a broadcast response comprising its state (namely, "aborted") and a state of all of the other participants in the transaction (e.g., Participant 2 and Participant 3) which Participant 1 broadcasts to all of the other participants.

An example of the broadcast response is shown below:
Broadcast Response:
state (P1—"aborted"; P2—"prepared"; P3—"unknown")

In response, Participant 1 can forget the transaction and has a resulting state of "no record"

6.2.3 Prepared

With reference to 6.2.3.1, in response to all of the participants being prepared, Participant 1 commits. Participant 1 generates and transmits a first response comprising its state (namely, "committed") to the second receiver (414).

Participant 1 updates state data of the participants in memory (327). An example of the state data is shown below:
State Data:
TID; P1—"committed"; P2—"prepared"; P3—"prepared"

Participant 1 generates a broadcast response comprising its state (namely, "committed") and a state of all of the other participants in the transaction (e.g., Participant 2 and Participant 3) which Participant 1 broadcasts to all of the other participants.

An example of the broadcast response is shown below:
Broadcast Response:
state (P1—"committed"; P2—"prepared"; P3—"prepared")

With reference to 6.2.3.2, in response to all of the participants being in a committed state, Participant 1 can forget the transaction and has a resulting state of "no record".

With reference to 6.2.3.3, in response to all of the participants not being prepared, Participant 1 updates state data of the participants in memory (327). An example of the state data is shown below:

State Data:

TID; P1—"prepared"; P2—"prepared"; P3—"unknown"

Participant 1 ignores the broadcast response from Participant 2 in that Participant 1 does not broadcast a broadcast response.

6.2.4 Committed

If Participant 1's state is "committed," Participant 1 ignores the broadcast response from Participant 2 in that Participant 1 does not broadcast a broadcast response.

This is because, prior to Participant 1 receiving the broadcast response from Participant 2, Participant 1 received a broadcast response from Participant 3. An example of the broadcast response is shown below:

Broadcast Response:

state (P1—"prepared"; P2—"prepared"; P3—"committed")

In response to all of the other participants being prepared, Participant 1 prepared and committed.

Table 6.3

In response to committing, a participant (e.g., Participant 2) generates a broadcast response comprising Participant 2's state (namely, "committed") and a state of all of the other participants in the transaction (e.g., Participant 1 and Participant 3) which Participant 1 broadcasts to all of the other participants.

An example of the broadcast response is shown below:

Broadcast Response:

state (P1—"prepared"; P2—"committed"; P3—"prepared")

In response to a participant (e.g., Participant 1) receiving the broadcast response from Participant 2, Participant 1 executes one or more actions, depending on its state.

6.3.1 No Record

If Participant 1's state is "no record", this is because Participant 1 committed and forgot the transaction. Participant 1 generates a broadcast response comprising its state (namely, "committed") and a state of all of the other participants in the transaction (e.g., Participant 2 and Participant 3) which Participant 1 broadcasts to all of the other participants.

An example of the broadcast response is shown below:

Broadcast Response:

state (P1—"committed"; P2—"committed"; P3—"committed")

A resulting state of Participant 1 is "no record".

6.3.2 In Flight

It should be understood that Participant 1 cannot have a state of "in flight". This is because, if Participant 1 receives the broadcast response from Participant 2 comprising Participant 2's state of "committed", Participant 1 must have prepared (or committed).

6.3.3 Prepared

With reference to 6.3.3.1, if Participant 1's state is "prepared", Participant 1 commits. Participant 1 generates and transmits a first response comprising its state (namely, "committed") to the second receiver (414) and generates a broadcast response comprising its state (namely, "committed") and a state of all of the other participants in the transaction (e.g., Participant 2 and Participant 3) which Participant 1 broadcasts to all of the other participants.

An example of the broadcast response is shown below:

Broadcast Response:

state (P1—"committed"; P2—"committed"; P3—"prepared")

With reference to 6.3.3.2, in response to all of the participants being in a committed state, Participant 1 can forget the transaction and has a resulting state of "no record".

6.3.4 Committed

With reference to 6.3.4.1, in response to all of the participants being in a committed state, Participant 1 can forget the transaction and has a resulting state of "no record".

With reference to 6.3.4.2, in response to not all of the participants not being in a committed state, Participant 1 updates state data of the participants in memory (327). An example of the state data is shown below:

State Data:

TID; P1—"committed"; P2—"committed"; P3—"prepared"

Participant 1 ignores the broadcast response from Participant 2 in that Participant 1 does not broadcast a broadcast response.

Table 6.4

A participant (e.g., Participant 2) that has a state of "prepared," is able to commit if all other participants have prepared.

If Participant 2 does not receive a response comprising another participant's state (e.g., Participant 1), preferably, after a pre-configurable time interval, Participant 2 generates a broadcast request comprising Participant 2's state and a state of all of the other participants in the transaction (e.g., Participant 1 and Participant 3) which Participant 2 broadcasts to all of the other participants.

An example of the broadcast request is shown below:

Broadcast Request:

requestState (P1—"unknown"; P2—"prepared"; P3—"unknown")

In response to receiving the broadcast request, Participant 1 executes one or more actions, depending on its state.

6.4.1 No Record

If Participant 1's state is "no record," this is because preparation failed as described with reference to 6.2.1.

6.4.2 In Flight

If Participant 1's state is "in flight," Participant 1 prepares as described with reference to 6.2.2.

6.4.3 Prepared

With reference to 6.4.3.1, if Participant 1's state is "prepared," and all other participants are prepared, Participant 1 executes actions as described with reference to 6.2.2.1.

With reference to 6.4.3.2, if Participant 1's state is "prepared," and at least one of the participants is not prepared, Participant 1 updates state data of the participants in memory (327). An example of the state data is shown below:

State Data:

TID; P1—"prepared"; P2—"prepared"; P3—"unknown"

Instead of Participant 1 ignoring the broadcast response from Participant 2 as in 6.2.3.3, Participant 1 generates a broadcast response comprising its state (namely, "prepared") and a state of all of the other participants in the transaction (e.g., Participant 2 and Participant 3) which Participant 1 broadcasts to all of the other participants.

An example of the broadcast response is shown below:

Broadcast Response:

state (P1—"prepared"; P2—"prepared"; P3—"unknown")

6.4.4 Committed

If Participant 1's state is "committed," instead of Participant 1 ignoring the broadcast response from Participant 2 as in 6.2.4, Participant 1 generates a broadcast response comprising its state (namely, "committed") and a state of all of the other participants in the transaction (e.g., Participant 2 and Participant 3) which Participant 1 broadcasts to all of the other participants.

An example of the broadcast response is shown below:

Broadcast Response:

state (P1—"committed"; P2—"prepared"; P3—"prepared")

Alternatively, rather than Participant 1 broadcasting a response to all other participants, Participant 1 only transmits a response to the participant (e.g., Participant 2) that sent the broadcast request (i.e., "requestState").

Table 6.5

A participant (e.g., Participant 2) that has a state of "committed", is able to forget if all other participants have committed.

If Participant 2 does not receive a response comprising another participant's state (e.g., Participant 1), preferably, after a pre-configurable time interval, Participant 2 generates a broadcast request comprising Participant 2's state and a state of all of the other participants in the transaction (e.g., Participant 1 and Participant 3) which Participant 2 broadcasts to all of the other participants.

An example of the broadcast request is shown below:
Broadcast Request:
requestState (P1—"prepared"; P2—"committed"; P3—"committed")

In response to receiving the request, Participant 1 executes one or more actions, depending on its state.

It should be understood that a participant can also broadcast a broadcast request if the participant fails and wants to rebuild the transaction's state upon restart.

6.5.1 No Record

If Participant 1's state is "no record," this is because Participant 1 committed and forgot the transaction as described with reference to 6.3.1.

6.5.2 In Flight

It should be understood that Participant 1 cannot have a state of "in flight." This is because, if Participant 1 receives the broadcast response from Participant 2 comprising Participant 2's state of "committed," Participant 1 must have prepared (or committed).

6.5.3 Prepared

In response to all of the participants being prepared, Participant 1 commits as described with reference to 6.3.2.

6.5.4 Committed

With reference to 6.5.4.1, in response to all of the participants being in a committed state, Participant 1 can forget the transaction and has a resulting state of "no record".

With reference to 6.5.4.2, in response to not all of the participants not being in a committed state, Participant 1 updates state data of the participants in memory (327). An example of the state data is shown below:
State Data:
TID; P1—"committed"; P2—"committed"; P3—"prepared"

Participant 1 generates a broadcast response comprising its state (namely, "committed") and a state of all of the other participants in the transaction (e.g., Participant 2 and Participant 3) which Participant 1 broadcasts to all of the other participants.

An example of the broadcast response is shown below:
Broadcast Response:
state (P1—"committed"; P2—"committed"; P3—"prepared"

Alternatively, rather than Participant 1 broadcasting a response to all other participants, Participant 1 only transmits a response to the participant (e.g., Participant 2) that sent the broadcast request (i.e., "requestState").

Table 6.6

If a decision is backout, the second data generator (410) generates a backout request comprising data, namely, the unique identifier associated with the transaction and an identifier associated with all of the participants in the transaction. An example of the backout request is shown below:
backout (TID, P1, P2, P3)

The backout request is sent by the second transmitter (412) to at least one participant.

In response to receiving the backout request from the second transmitter (412), a participant (e.g., Participant 1) executes one or more actions, depending on its state.

6.6.1 No Record

If Participant 1's state is "no record", this is because prior to receiving the backout request, Participant 1 receives a broadcast response from Participant 2, indicating that Participant 2's state is aborted. In response, Participant 1 aborts and forgets the transaction.

A resulting state of Participant 1 is that it has no log records (i.e., "no record") associated with the transaction.

Thus, in response to receiving the backout request from the second transmitter (412), Participant 1 generates and transmits a response comprising its state (namely, "backed out") to the second receiver (414).

The second transmitter (412) transmits the response to the first receiver (404). Thus, the application (325) is able to receive the response even if each of the other participants (e.g., Participant 2 and Participant 3) fails.

6.6.2 In Flight

If Participant 1's state is "in flight," Participant 1 aborts and Participant 1 generates and transmits a response comprising its state (namely, "backed out") to the second receiver (414).

Participant 1 forgets the transaction and a resulting state of Participant 1 is that it has no log records (i.e., "no record") associated with the transaction.

6.6.3 Prepared

It should be understood that Participant 1 cannot have a state of prepared. This is because, in response to a backout decision from the application (325), the second data generator (410) immediately generates a backout request which the second transmitter (412) to at least one participant. That is, a prepare request is not generated by the second data generator (410) and sent by the second transmitter (412).

6.6.4 Committed

It should be understood that Participant 1 cannot have a state of committed. This is because, in response to a backout decision from the application (325), the second data generator (410) immediately generates a backout request which the second transmitter (412) to at least one participant. That is, a prepare request is not generated by the second data generator (410) and sent by the second transmitter (412).

Table 6.7

In response to a participant (e.g., Participant 2) receiving a prepare request, if preparation is not successful, Participant 2 aborts after attempting to prepare.

In response, Participant 2 generates and transmits a response comprising Participant 2's state (namely, "backed out") to the second receiver (414) and generates a broadcast response comprising Participant 2's state (namely, "aborted") and a state of all of the other participants in the transaction (e.g., Participant 1 and Participant 3) which Participant 1 broadcasts to all of the other participants. An example of the broadcast response is shown below:
state (P1—"unknown"; P2—"aborted"; P3—"unknown")

In response, Participant 2 can forget the transaction and a resulting state of Participant 2 is that it has no log records (i.e., "no record") associated with the transaction.

In response to receiving the broadcast response from Participant 2, Participant 1 executes one or more actions, depending on its state.

6.7.1 No Record

If Participant 1's state is "no record," this is because prior to Participant 1 receiving the broadcast response from Participant 2, Participant 1 receives a broadcast response from Participant 3 indicating that Participant 3 aborted.

Participant 1 ignores the broadcast response from Participant 2 in that Participant 1 does not broadcast a broadcast response.

6.7.2 In Flight

If Participant 1's state is "in flight," Participant 1 aborts and Participant 1 generates and transmits a response comprising its state (namely, "backed out") to the second receiver (414).

Participant 1 can forget the transaction and a resulting state of Participant 1 is that it has no log records (i.e., "no record") associated with the transaction.

6.7.3 Prepared

If Participant 1's state is "prepared," Participant 1 aborts and Participant 1 generates and transmits a response comprising its state (namely, "backed out") to the second receiver (414).

Participant 1 can forget the transaction, and a resulting state of Participant 1 is that it has no log records (i.e. "no record") associated with the transaction.

6.7.4 Committed

It should be understood that Participant 1 cannot have a state of committed. This is because, in order to have done so, all other participants (e.g., Participant 2 and Participant 3) must have prepared.

The invention claimed is:

1. A method for resolving a transaction involving a plurality of participants without using a transaction coordinator, the method comprising the steps of:
    configuring a computer system having at least one processor and at least one memory to carry out the following step:
        generating a logic by a logic generator upon receiving an input by an input receiver;
        aggregating the logic with an owning application of the transaction;
        initiating the transaction by the owning application;
        generating an update request by the owning application;
        in response to the update request, generating, by an identifier generator associated with the logic, a transaction identifier associated with the transaction;
        upon receiving the transaction identifier, generating by a notification generator associated with the logic, a notification indicating that the transaction is under control of the logic and that there is no transaction coordinator;
        transmitting the update request, the transaction identifier, and the notification to each of the plurality of participants;
        in response to receiving the update request, the transaction identifier, and the notification, each participant performing the update request; and
        in response to each participant successfully performing the update request, generating a decision by the owning application.

2. The method as claimed in claim 1, wherein the input comprises at least one of: a command and an identifier associated with the logic.

3. The method as claimed in claim 1, further comprising the steps of:
    obtaining, by each of the plurality of participants, identifier data associated with each of the other plurality of participants;
    obtaining, by each of the plurality of participants from each of the other plurality of participants, a first message comprising a state associated with the transaction; and
    using, by at least one participant, a received first message to resolve the transaction.

4. The method as claimed in claim 3, wherein the using step comprises:
    aggregating the state in the first message with a state associated with the at least one participant; and
    using the aggregated states to resolve the transaction.

5. The method as claimed in claim 3, wherein the first message further comprises a list of identifiers associated with each of the plurality of participants involved in the transaction.

6. The method as claimed in claim 3, further comprising the step of: in response to resolving the transaction, sending by the at least one participant to at least one of the other plurality of participants, a second message.

7. The method as claimed in claim 6, wherein the second message comprises an outcome associated with the transaction.

8. The method as claimed in claim 3, wherein the step of obtaining the first message comprises:
    sending a request for the first message, by a first participant to a second participant; and
    in response to receiving the request, sending the first message, by the second participant to the first participant.

9. A system for resolving a transaction involving a plurality of participants, the system comprising:
    at least one memory; and
    at least one processor configured to:
        generate a logic by a logic generator upon receiving an input by an input receiver;
        aggregate the logic with an owning application of the transaction;
        initiate the transaction by the owning application;
        generate an update request by the owning application;
        in response to the update request, generate, by an identifier generator associated with the logic, a transaction identifier associated with the transaction;
        upon receiving the transaction identifier, generate by a notification generator associated with the logic, a notification indicating that the transaction is under control of the logic and that there is no transaction coordinator;
        transmit the update request, the transaction identifier, and the notification to each of the plurality of participants; and
        in response to each participant successfully performing the update request, generate a decision by the owning application.

10. The system as claimed in claim 9, further comprising a transmitter for transmitting the identifier and the notification to each of the plurality of participants.

11. The system as claimed in claim 9, further comprising a receiver for receiving input associated with aggregation of the logic, wherein the input comprises at least one of a command and an identifier associated with the logic.

12. The system as claimed in claim 9, further comprising:
    means for obtaining, by each of the plurality of participants, identifier data associated with each of the other plurality of participants;
    means for obtaining, by each of the plurality of participants from each of the other plurality of participants, a first message comprising a state associated with the transaction; and
    means for using, by at least one participant, a received first message to resolve the transaction.

13. The system as claimed in claim 12, wherein the using means further comprises:
    means for aggregating the state in the first message with a state associated with the at least one participant; and means for using the aggregated states to resolve the transaction.

14. The system as claimed in claim 12, wherein the first message further comprises a list of identifiers associated with each of the plurality of participants involved in the transaction.

15. The system as claimed in claim 12, further comprising means, responsive to resolution of the transaction, for sending by the at least one participant to at least one of the other plurality of participants, a second message.

16. The system as claimed in claim 15, wherein the second message comprises an outcome associated with the unit of work.

17. The system as claimed in claim 12, wherein the means for obtaining the first message further comprises:
   means for sending a request for the first message, by a first participant to a second participant; and
   means, responsive to receiving the request, for sending the first message, by the second participant to the first participant.

18. A non-transitory computer-readable medium in which is embedded computer-readable code that, when loaded onto and executed by a computer, causes the computer to resolve a transaction involving a plurality of participants by performing the steps of:
   generating a logic by a logic generator upon receiving an input by an input receiver;
   aggregating the logic with an owning application of the transaction;
   initiating the transaction by the owning application;
   generating an update request by the owning application;
   in response to the update request, generating, by an identifier generator associated with the logic, a transaction identifier associated with the transaction;
   upon receiving the transaction identifier, generating by a notification generator associated with the logic, a notification indicating that the transaction is under control of the logic and that there is no transaction coordinator;
   transmitting the update request, the transaction identifier, and the notification to each of the plurality of participants;
   in response to receiving the update request, the transaction identifier, and the notification, each participant performing the update request; and
   in response to each participant successfully performing the update request, generating a decision by the owning application.

* * * * *